April 26, 1955    R. B. NAWMAN    2,707,060
RECEPTACLE HANDLING AND STACK DUMPING APPARATUS
Filed July 31, 1948    5 Sheets-Sheet 1

INVENTOR.
ROLLIE B. NAWMAN
BY Joseph B. Gardner

April 26, 1955  R. B. NAWMAN  2,707,060
RECEPTACLE HANDLING AND STACK DUMPING APPARATUS
Filed July 31, 1948  5 Sheets-Sheet 4

INVENTOR.
ROLLIE B. NAWMAN
BY Joseph B. Gardner
atty.

United States Patent Office 2,707,060
Patented Apr. 26, 1955

2,707,060

RECEPTACLE HANDLING AND STACK DUMPING APPARATUS

Rollie B. Nawman, Oakland, Calif., assignor to Benner-Nawman, Inc., Oakland, Calif., a corporation of California Application July 31, 1948, Serial No. 41,828

15 Claims. (Cl. 214—306)

The present invention relates to the art of container handling and more particularly to the art of handling filled boxes or similar open containers presented in stacked array and to the discharging of the contents from groups of such containers. The principles of the invention are herein illustrated and discussed with particular reference to the handling of lug boxes filled with fruit, vegetables or similar aggregate materials of more or less tender and perishable nature, the expeditious discharging of the materials from the containers, and the subsequent disposal of the empty containers.

In divers industries, particularly those concerned with the canning or other processing of food products, it has been found necessary, in order to maintain a profitable production schedule, to provide high speed machinery for the rapid and facile handling of large numbers of containers filled with the substance to be processed. For example, in the fruit and vegetable preparation industries, the comestibles to be processed are commonly delivered to the plant in rather heavy wooden boxes or lugs and it is both necessary and desirable to provide means for the rapid handling and discharge of these containers, partly to reduce spoilage of the produce due to extended storage periods before processing can be started and partly to permit more efficient utilization of working time than is possible when a large group of men is required for the manual handling of containers that are delivered to the plant in great numbers. Various embodiments of suitable equipment for handling stacked containers are known to the art, and one of such embodiments is disclosed in my co-pending application Serial No. 723,008, filed January 20, 1947, now Patent No. 2,598,713, issued June 3, 1952.

The present invention contemplates certain structural and operational improvements and modifications over and in connection with equipment of the type generally outlined above. These improvements have been found by operating tests in the apparatus of the present invention to reduce manufacturing and maintenance costs, to reduce damage to the materials being handled and to increase the efficiency of the equipment with respect to the unit time volume of containers handled.

It is an object of the present invention to provide improved apparatus designed particularly for the handling of vertically piled boxes or other articles of the class described arranged on a platform or portable pallet in a group comprising a plurality of adjacently arranged stacks.

Another object of the invention is to provide an apparatus of the class described in which the speed of operation of handling and emptying of the boxes, and the discharge of the contents of the boxes from the apparatus, may be governed so as to afford a control of the quantity of such contents to be delivered to a cannery or other handling or processing station.

A further object of the invention is to provide apparatus of the character described which is capable of rapidly dumping large quantities of stacked receptacles in a given period of time and which requires a minimum of trucking operations to replenish the supply of stacks to be dumped, and in which all operations including moving the stacks of receptacles to dumping position, actual dumping, and subsequent removal of the empty receptacles are readily and instantly controllable by a single operator.

Further, it is an object of this invention to provide apparatus in which the various receptacles are gently handled during conveyance and dumping without shocks, crushing or other strains induced by dropping or abrupt movement and in which the materials contained in the receptacles are discharged into the receiving unit without danger of violent contact with any part of the handling and dumping equipment, thereby obviating devaluating damage to the materials by bruising, crushing, or puncture.

A further particular object of this invention is to provide improved receptacle dumping means including a conveyor, wherein the filled receptacles are transposed to a reclining position on the conveyor in rapid and closely succeeding order without danger of damage to the contents thereof by virtue of the receptacles falling on or crushing any of the material prematurely discharged from the receptacles and lodged either between adjacent receptacles or between the receptacles and the conveyor.

It is an additional object of the invention to provide means for placing a tilted stack of receptacles upon a conveyor in proper alignment, preparatory to delivery to a dumping unit, so as to obviate jamming of the receptacles or dumping unit during passage of receptacles on the conveyor or through the dumping unit.

It is also an object of this invention to provide an improved closure means for the open receptacle at the top of each stack, whereby spilling of contents from said receptacles during tilting of the stack is prevented.

Still another object of the invention is to provide in apparatus of the character referred to a receptacle-handling conveyor arranged at such an angle of inclination that stacks of receptacles resting thereon and being moved thereby will remain in unit formation with each receptacle in contiguous engagement with its neighbor until the end of the conveyor is reached prior to dumping thus causing the contents of all but the leading receptacle to be retained against premature spillage by the presence of the adjoining receptacle thereover.

A still further object of the invention is to provide, in apparatus of the type set forth, take-away conveyor mechanism arranged to intercept sub-groups of dumped receptacles of a main group thereof and designed to impart accelerated and changed direction of movement to the receptacle sub-groups so that the latter will adequately clear successive sub-groups of receptacles rapidly deposited on the takeaway conveyor.

Yet another object of the invention is to provide, in apparatus of the character referred to, means operative to effect tilting of a marginal stack of receptacles from a main group of stacks thereof wherein the tilting is accomplished about a pivotal axis arranged in such manner that lifting of any portion of the receptacles in the marginal stack will not occur, thus preventing damage or dislodgement in case the receptacles of the marginal stack are intermeshed with those of a stack of the main group of stacks.

It is an additional object of the invention to provide in apparatus of the class described, mechanism for bodily moving comparatively high stacks of receptacles from erect to reclining positions in which means are embodied for securely embracing the stacks during transposition in order to insure against buckling and collapse of the stacks.

It is a further object of the invention to provide in receptacle dumping apparatus, including a constantly moving dumping conveyor and wherein the receptacles to be dumped are supplied to the apparatus in vertical stacks, means for moving successive stacks bodily from a primary receiving position to a secondary position overlying and uniformly spaced above the dumping conveyor and operation to release the stack from its secondary position to and upon the dumping conveyor with all portions of the adjacent side of the receptacles brought into contact with the surface of the conveyor simultaneously.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1 is a top plan view of a box handling and dumping apparatus incorporating the improvements of the invention.

Figure 2 is a side elevational view of the apparatus shown in Figure 1.

Briefly, the apparatus of my invention as here shown includes a load-platform for receiving and positioning a pallet of stacked receptacles, from which successive stacks of receptacles are moved to a stack tilting unit, the stacks being thereafter successively tilted to an angularly related or relatively reclining position by the tilting unit, the horizontally disposed stacks being subsequently placed on a conveyor by the tilting unit and carried by the conveyor to a dumping unit in which each receptacle is completely emptied of material and removed in a desired position and the material is accumulated and conveyed away for processing.

Referring to the drawings and particularly to Figure 2, there is shown a complete machine, the major component parts of which in order from right to left comprise a pallet receiving platform or primary loading station 1, a stack advancing unit 2, a stack tilting unit 3, a dumping conveyor unit 4, and a box inverting and takeaway unit 6. As a support for the three first-named units and for part of the fourth, there is provided a pair of parallel horizontally spaced channel or other structural beams 11 mounted on transversely extending, channel beam sections 12, 13, 14, and 16 forming a base adapted to support the major portion of the apparatus of the present invention and designed to be secured to a suitable substructure or foundation.

Figure 3:
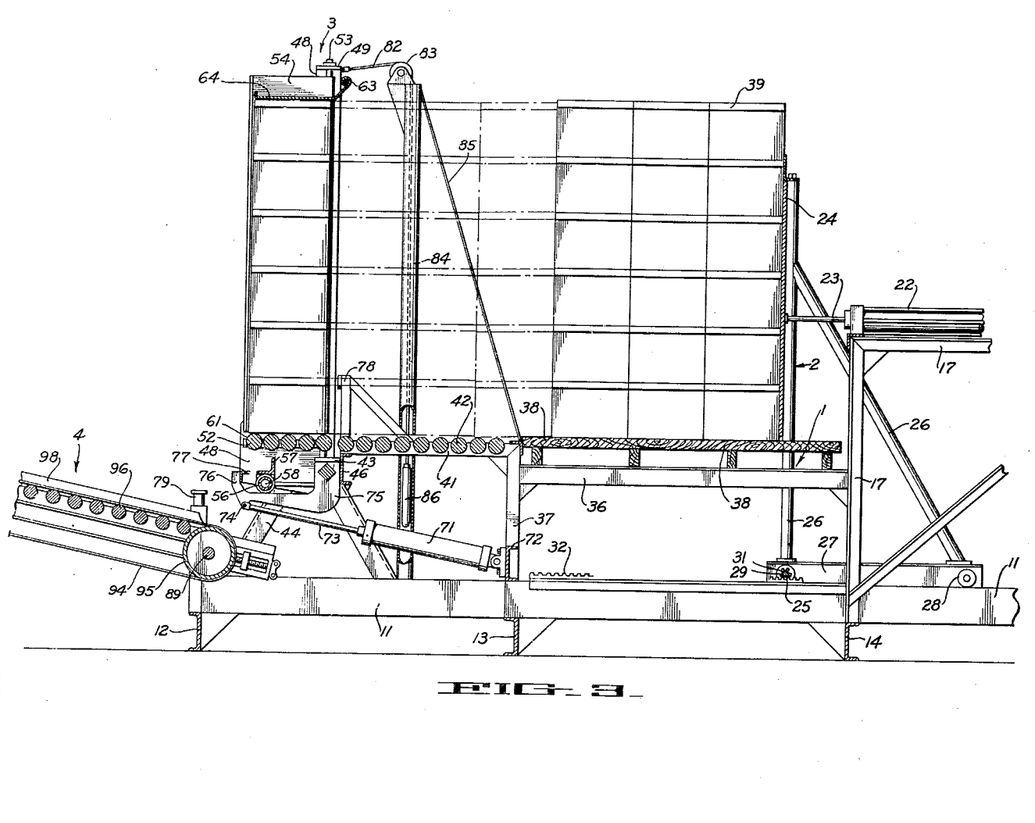
Figure 3 is an enlarged scale vertical sectional view of a portion of the apparatus taken in the plane indicated by the line 3—3 in Figure 1, a stack of boxes being shown prior to being tilted.

Located at what may be referred to as the rear end of the aforementioned base structure is a box-like frame 17, rigidly fastened at the lower portion thereof to the beam sections 14 and 16 and carrying on the upper side thereof a horizontally extending fluid pressure cylinder 22 provided with the usual internal piston (not shown) connected with a piston rod 23 extending externally of the cylinder. The distal end of the piston rod 23 is secured in any desired manner to a horizontally movable pusher plate 24, best shown in Figure 3, which is rigidly united to supporting legs and struts 26 mounted on base plates 27, which are preferably of angular cross-sectional form and disposed parallel with the beams 11, the side flanges of the base plates downwardly overlapping the sides of the beams 11. Rear rollers 28 mounted on stub shafts carried by the vertical portion of the base plates 27, and front rollers 29 mounted on a shaft 25 extending between the base plates 27 are provided to travel along the upper flange of the beams 11 as shown in Figure 3 and thus facilitate lateral travel of the pusher plate 24 upon activation of the pressure cylinder 22. For maintaining the pusher plate 24 constantly rectangularly related to the longitudinal dimension of the base structure, pinions 31 are fixedly mounted on the relatively confronting faces of the rollers 29 and adapted to mesh with and travel along racks 32 welded or otherwise suitably secured to the inner edge of the upper flange of the beams 11.

The pallet receiving platform 1, which is arranged adjacent the stack delivering unit 2 and located substantially midway on the supporting structure, comprises a flat bed composed of structural members 36 preferably united at one end to vertical components of the frame 17 and at the other end to upright support members 37 which rise from the beams 11 and are welded or otherwise suitably thereto. The bed 36 is suitably dimensioned to receive portable pallets 38, of the type commonly used with forklift trucks and which serve to support grouped stacks of receptacles 39 to be emptied. In the particular form of the invention shown in the drawings, the portable pallets 38, in the interests of maximum production capacity of the dumping apparatus, may support a plurality greater than four stacks of containers arranged contiguously thereon, as will be seen from Figure 1 wherein two of the stacks are shown in position on the stack tilting unit 3. Secured to and extending horizontally from the top of the support members 37, in substantial coplanar relation with the upper surface of the bed 36, are elongated support bars 41 in which are suitably journaled a plurality of freely rotatable rollers 42 disposed in relatively spaced relation along the length thereof. The forward portions of the support bars 41 rest on and are secured to a transversely extending frame member 43 suitably supported upon a pair of spaced pedestal frames 44 attached in any desirable manner to the channel beams 11 and forming rigid units therewith. While the roller conveyor aforesaid is desirable in certain instances, it may be dispensed with where no extension of the pallet receiving platform is required.

Figure 7:
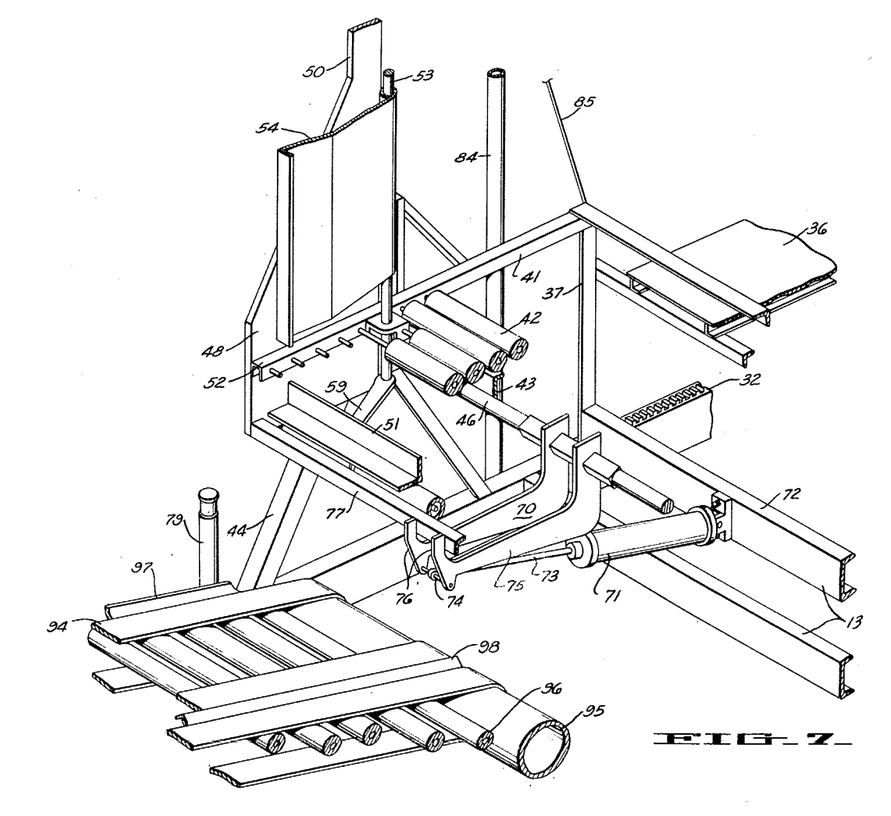
Figure 7 is an enlarged isometric view showing a portion of the tilting mechanism of the apparatus.

Provided on the base structure and adjacent the horizontally disposed rollers 42 is a stack tilting unit 3 adapted to move receptacles in unit stacks from a substantially vertical primary position to a substantially reclining secondary position. A pivot element 46 located at the lower portion of the stack tilting unit 3 is supported in mounts 47 on the pedestal frames 44 and is attached in any suitable manner to parallel spaced side plates generally denoted by the reference numeral 45 and each of which has a broadened base portion 48 and a relatively narrow vertically extending upper portion 50 as shown to best advantage in Figure 7. Mounted for rotation and supported at their ends in brackets 49 and 51 secured respectively to the upper portions 50 of the side plates and to horizontal carrier elements 52 suitably fastened to the side plates 48, are vertically extending actuators here shown as shafts 53 having gripper members 54 here shown in the forms of plates or wings rigidly united to the shafts 53 and extending radially therefrom. To permit embracing of the stacked receptacles 39 by the clamping members 54, each of the latter extends inwardly and away from the stack receiving platform 1 and is provided with a longitudinally extending side portion terminating in a vertically disposed and inwardly directed lip positionable, upon rotary movement of its shaft 53, to intercept the outermost leading corner of a stack and to bring the stack into properly aligned relation with the tilting mechanism.

For moving the clamping members 54 to effect the stack-engaging action thereof aforesaid, a double acting fluid pressure cylinder 56 is arranged in axially transverse relation with and between the side plates 48 at the lower portion of the latter. The cylinder 56 is mounted on a cross piece 57 and is adapted to apply pressure to opposed and independently movable piston rods 58 extending from either end of the cylinder. Slidably connected with the piston rods 58 are slotted lever arms 59 which are united to the lower end of the respective shafts 53 and which serve to translate the axial and opposite motion of the piston rods 58 into reciprocal rotary motion of the side-gripper plates 54.

As a supporting floor for the stacks of receptacles 39 within the tilting unit 3, a plurality of transversely extending rollers 61 is journaled in and spaced along the length of the carrier elements 52 and arranged in coplanar relation with the rollers 42 when the latter are provided in the apparatus. The rollers 61 will thus form an extension of the conveyor surface defined by the rollers 42. Extending between and journaled in bearings 62 mounted on the upper ends of the side plate upper portions 50 is a shaft 63 to which is suitably secured a cover plate 64 serving as a movable lid for the open tops of the uppermost of the stacked receptacles 39. As a means for rotating the cover plate 64, there is provided a fluid pressure cylinder 66 extending vertically from and united to the shaft 46. The cylinder 66 is arranged parallel to one of the side plates 48, and has a piston rod 67 and upper extension 68 pivotally connected to a crank 69, fixed to the shaft 63 so that vertical travel of the piston rod 67 results in raising or lowering of the cover plate 64 relative to the uppermost boxes of the stacks.

Figures 4, 5:
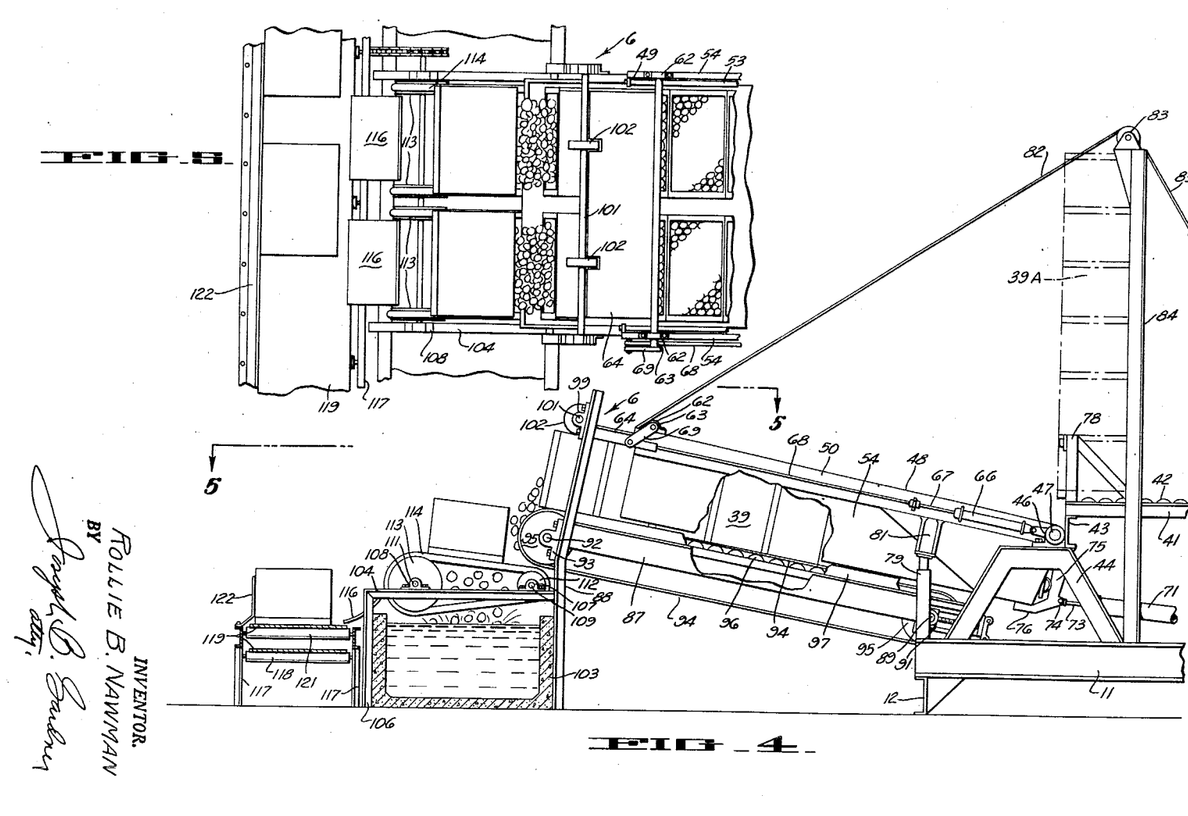
Figure 4 is a side elevational view, similar to Figure 3 and partly in section, showing the stack of boxes in tilted condition.
Figure 5 is a portional top plan view of the structure shown in Figure 4.
Figure 6:
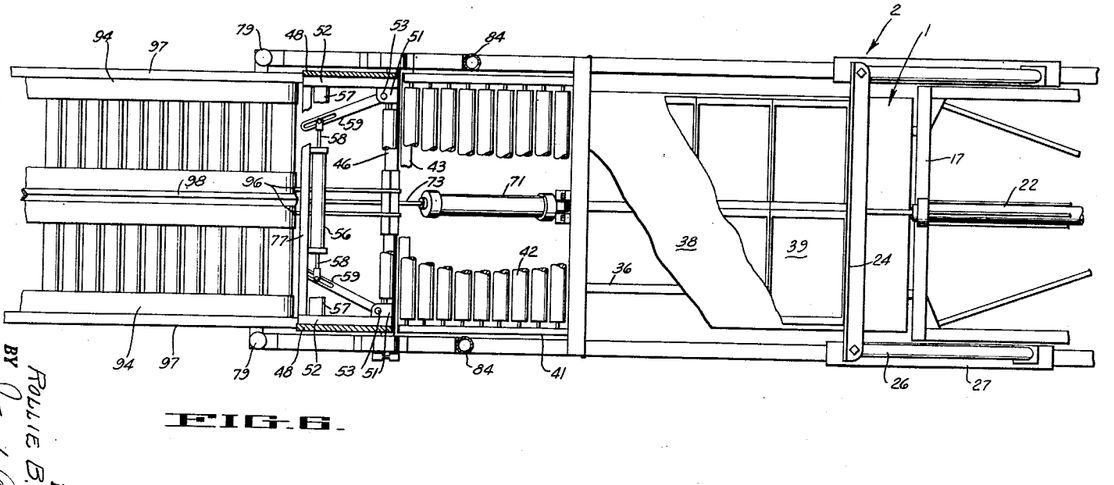
Figure 6 is an enlarged top plan view of a portion of the apparatus, parts thereof being broken away so as to more clearly disclose the underlying structure.

For pivotally moving the stack tilting unit 3 from the substantially vertical stack receiving position shown in Figure 2 to the substantially reclining delivering position shown in Figure 4, is a fluid pressure cylinder 71 here shown located below the rollers 42 and having one end pivoted on and located substantially centrally of a channel or other beam 72 which is mounted transversely between the support members 37. A piston rod 73 extending from the cylinder 71 has a pivotal connection to a shaft 74 uniting the terminal portions of two parallel relatively spaced and U-shaped rockers 76 having vertically extending arms 75 which surround and are united to a centrally located squared section of the shaft 46 in any suitable manner, the other vertically extending arm 70 being welded or similarly attached to a transversely extending bar 77 which is disposed between the lower portions of the side plates 48 to which it is welded or otherwise attached.

To limit the return or upward travel of the tilting unit 3, so as to bring the unit into substantial perpendicularity with respect to the base structure, stop brackets 78 are provided on the upper surface of the carrier elements 41 in substantial planar alignment with and arrangeed to be engaged by the side plates 48, correspondingly, stop pillars 79 mounted vertically on the beams 11 in opposition to brackets 81 suitably positioned and attached to the side plates 48, are provided for interengagement so as to limit the downward movement of the tilt unit. Attached to the uppermost end of each side plate portion 50 is a wire cable 82, each of which is guided in a pulley 83 suitably journaled on the upper end of a post 84 extending vertically from the beam 11 intermediate the ends of the carrier element 41 and being stabilized by a bracing support 85 interconnecting the post and base structure. A supporting weight 86 is preferably attached to each cable 82 and serves as a counterbalance during pivoting movements of the tilting unit 3. It will be noted that the axis of the pivot shaft 46 of the tilting unit is positioned so as to lie below the stack supporting surface as defined by the rollers 61, and at the same time said shaft, in respect to its horizontal relation to the unit is positioned so as to lie in vertical alignment with or rearwardly of the portion of the unit which substanially coincides with the rearward side of the stack of receptacles when operatively disposed in the unit preparatory to tilting. By reason of the foregoing no portion of any of the receptacles in the stack in the unit will be subjected to a raising or lifting action on tilting of the unit, and thus no damage or disalignment of the receptacles may occur in case the receptacles of the stack in the unit are intermeshed with the receptacles of the stack 39 remaining on the rollers 42 or on the pallet.

Positioned adjacent and extending from the stack tilting unit 3 is the dumping conveyor unit 4 having a rectangular base frame 87 supported at one end by the beam member 11 and at the other end by upright structural members 88 rising from the floor or other supporting surface. Carried by the frame 87, at the end thereof adjacent the stack tilting unit, are laterally spaced slidable take-up bearings 91 journaling cross shaft 89. A similar cross shaft 92 parallel to shaft 89 is journaled at the other end of the frame 87 in bearings 93 bolted or otherwise fastened to the upright members 88. Shafts 89 and 92 have pulleys 95 affixed thereon which carry in parallel relationship spaced pairs of continuous flexible belts 94 or equivalent web or link carriers serving as conveyors. Journaled between and positioned laterally of the longitudinal members of the frame 87 is a plurality of spaced rollers 96 which serve to support the upper portion of the belts 94 so as to prevent sagging when loads are being carried on the belts. Side rails 97, mounted on the longitudinal members of the frame 87 and which may conveniently serve as bearing supports for the rollers 96, serve also as side restraining guide for the stacks of receptacles 39 when the latter are on the conveyor belts 94. Also provided for directing the receptacles along the conveyor belts 94 is a dividing rail 98 suitably mounted on the frame 87 and extending longitudinally thereof between each pair of the belts. One of either of the shafts 89 and 92, preferably the latter, is connected to a suitable source of power, not shown, such as an electrically driven speed reduction gear for so driving the conveyor belts 94 that stacks of receptacles 39 resting thereon are moved linearly away from the stack tilting unit 3 to the inverting unit 6. The arrangement of the parts and the degree of inclination of the conveyor belts 94 is such that the receptacles will maintain positions of stable equilibrium on their sides during movement and will also remain in relatively contiguous relationship during such movement so that premature spillage of the contents due to tipping or relative separation of the receptacles is obviated thus greatly lessening the danger of bruising or crushing of the contained material by the receptacles falling thereon or rubbing thereagainst. It will also be noted that the belts 94 of each pair thereof are spaced from each other, thus permitting any material accidentally spilled from the receptacles to drop between the belts and through the spaces between the rollers 96. In this manner the spilled material will not interfere with the proper positioning and movement of the receptacles over the belts, and may be recovered and utilized in its original condition.

Journaled in bearings 99 mounted on the upper portion of the upright members 88 at the delivery end of the conveyors 94 is a shaft 101 having rotary elements 102 keyed thereon. The said elements are provided with peripheral facings of rubber or other friction material and are positioned in spaced relation above conveyor belts 94 so as to engage centrally the uppermost portion of the receptacles when the latter are carried by the belts under the elements. The shaft 101 is power driven by a separate speed reduction unit or other suitable driving means, not shown, in such a manner that the peripheral speed of the elements 102 is greater than the linear speed of movement of the receptacles along the conveyor belts 94. In this way as each receptacle passes under one of the elements 102 the latter will cause the upper side of the receptacle to move forward with considerably accelerated speed relative to movement of the bottom side of the receptacle resting on the conveyor belts. This causes the receptacle to be suddenly tipped as it passes over the outer reach of the conveyor belts, and since the open side of the receptacle faces forwardly of the path of travel, the receptacle is flipped to an open-side-down position and thereby causing the contents to fall from the receptacle.

Positioned below the inverting unit 6 adjacent the delivery end of the conveyor unit 4 is a receiver unit here shown in the form of a wash tank 103, containing a body of water or other medium for cushioning the fall of the contents of the inverted receptacles as shown in Figures 4 and 5. Supported over the tank 103 by the upright members 88 and legs 106 is a frame 104 carrying bearings 107 and 108 for a pair of parallel shafts 109 and 111 respectively, which are disposed transversely of the longitudinal dimension of the conveyor unit 4. Suitably connected with and disposed axially along the shafts 109 and 111 are pluralities of pulleys 112 and 113, respectively, tractionally engaged with continuous flexible belts 114 forming conveyors upon which the inverted and empty receptacles may drop after being flipped from the distal end of the conveyor belt 94. One of the shafts 109 and 111, preferably the former, is powered by suitable driving means, not shown, to move the empty receptacles away from the inverting unit 3. The conveyor belts 114 are run at a much higher linear speed than the belts 94 so that the inverted and emptied boxes are moved out of the way as quickly as possible in order to make way for the next succeeding receptacles and to preclude the possibility of the contents becoming crushed or otherwise damaged by being caught between the receptacles. Extending tangentially downwardly from the peripheries of the pulleys 113 are spaced slides 116 leading to a conventional take-away conveyor running in a transverse direction with respect to the conveyor unit 4. The take-away conveyor is supported on a structural framework 117 journaling upper and lower sets of rollers 121 and 118 carrying the load and return reaches of a continuous conveyor belt 119. A plate guard rail 122 is mounted along the outer longitudinal side of the framework 117 and is designed to intercept the empty receptacles as the latter are thrown from the end of the conveyor belts 114, and in this manner maintaining and guiding the empty receptacles on the take-away conveyor during their passage therealong to the final collection station for such receptacles.

The operation of the apparatus will now be considered as from the time that transport pallets 38 laden with stacks of receptacles 39, to be emptied, are placed on the flat bed 36 of the stack receiving platform 1 by a fork-lift truck until the receptacles are finally individually emptied and disposed of. The entire receptacle-handling and dumping procedure accomplished by the apparatus of the present invention can be controlled by a single operator stationed at a strategic point where he can view, preferably, the end of the roller conveyor 42 where the latter abuts the rollers forming the bottom section of the tilting unit.

The first step in the operation involves moving the stacked receptacles 39 as a group so as to advance the foremost lateral file of stacks from the stack receiving platform 1 to the stack tilting unit 3 which is accomplished by manipulating the intake valve of the fluid pressure cylinder 22 so that the piston rod 23 is forcibly extended the desired amount to secure the aforesaid stack advancement. Since the piston rod is rigidly attached to the pusher plate 24, a corresponding motion along the longitudinal dimension of the base structure is imparted to the pusher plate. Thus, the pusher plate 24 travels in increments across the transport pallets 38 pushing the grouped stacks of receptacles 39 before it. As the pusher plate 24 moves across the pallets 38 the leading transverse file of stacks of receptacles 39 is forced over the plurality of rollers 42 until the foremost stacks are located on the rollers 61 within the tilting unit 3. The motion of the foremost stacks of receptacles 39 is arrested by the stop means provided by the inwardly extending flanges on the side clamping plates 54 and by the operator's actuation of the control valves of the piston 22. As the stacks of receptacles 39 come to rest, the operator causes activation of the fluid pressure piston 56 to retract the piston rods 58 thereby rotating the clamping plates 54 inwardly to firmly grip the outer sides of the stacks of receptacles 39. Simultaneously, the operator activates fluid pressure cylinder 66 to retract the piston rod 67 thereof and rotate the shaft 63 in such a manner that the cover plate 64 is brought to position tightly over and closing the open tops of the uppermost receptacles 39 to prevent spilling of the contents during the tilting operation. With the stacks of receptacles 39 thus firmly embraced within the stack tilting unit 3, the operator then adjusts the fluid pressure of the piston 71 so that piston rod 73 will pull against the rockers 76 to rotate the tilting unit 3 into an inclined position over and complementary with the inclination of the conveyor unit 4. As will be understood, when the stacks are tilted, the clamping plates 54 hold the stacks from buckling and are held thereby in rigid file relation above the conveyor unit.

As previously explained, when the stacks of receptacles 39 approach the conveyor unit 4, the tilting unit will be stopped as the lower surfaces of the receptacles reach a position slightly above the conveyor belts 94, such termination of movement of the unit being caused by engagement of the limiters 81 with the upper ends of the pillars 79. The operator thereupon reverses the fluid pressure of the cylinders 66 and 56 to swing the side gripper plates 54 and the cover plate 64 outwardly and upwardly respectively so as to thus release the receptacles and allow them to drop onto the conveyor belts 94 which move the receptacles to the inverting unit 6 for dumping.

In the food canning or processing industries, in which the apparatus of the present invention is particularly useful, the roughness and speed with which the receptacles are handled are not conducive to the establishment or preservation of precise vertical alignment of the receptacles in the stacks with the result that components of one stack may become overlapped, frequently to a considerable degree, with respect to the receptacles of immediately adjacent stacks. Thus there will be created an intermeshing of the stacks and, in stack dumping apparatus previously available, tilting of stacks arranged as aforesaid generally caused receptacle breakage and material spillage due to the inability of the overlapped receptacles in the tilting stack to extricate themselves at the inception of stack tilting movement. The principal cause of this difficulty has been the mislocation of the axis of tilting with the result that the tilting stack was in part actually raised somewhat during the start of the tilting movement. In the present apparatus, the foregoing disadvantage is overcome by positioning the pivot axis vertically sufficiently below the base plane of the stacks and horizontally in vertical or rearwardly of vertical alignment with the normal parting plane between the stack being tilted and the remaining stack. In this way the individual receptacles of the stack being tilted will be moved along a path which at its start is more nearly horizontal with the result that any overlapped receptacles will easily pull apart without causing damage to each other. It will thus be seen that initial precise alignment of the receptacles is not essential to proper operation of the present apparatus.

As soon as the receptacles 39 are unloaded, the tilting unit 3 is ready to handle the succeeding stack or stacks positioned to enter the tilting unit when returned to upright position, the return of the unit 3 to the upright position being effected when the operator opens the intake valve of the fluid pressure piston 71. The foremost stacks are then moved into the tilting unit 3 and the above outlined procedure of tilting and dumping is repeated.

When the transport pallets 38 on the stack receiving platform 1 have been emptied of stacks of receptacles 39, the pusher plate 24 is retracted to its normal position. The stack receiving platform 1 is so designed that the empty transport pallets 38 can be removed from one side while laden pallets are placed thereon from the other side.

It is to be noted that the pistons of the fluid pressure cylinders 22, 66, 71 and 56 can be operated from a single pressure source and since the movements are all synchronized the conveyor unit 4, inverting unit 6, conveyor belts 103, and takeaway conveyor belt 108 can be operated with a single motor.

I claim:

1. In apparatus for handling grouped vertical stacks of loaded receptacles to be dumped including means for receiving and supporting a group of stacks, means for delivering a selected stack from said group and a unit for inverting individual receptacles from their initial positions in said stack, the combination comprising stack tilting mechanism arranged to receive said selected stack and for moving the latter from its vertical position to a relatively reclining position, releasable clamp means for engaging opposed side portions of said selected stack to hold said receptacles relatively in substantial alignment during said tilting movement, conveyor means positioned to be approached by the selected stack upon reclining thereof, and means for releasing said clamp means for effecting transfer of receptacles from the reclining stack thereof to said conveyor means.

2. In apparatus for handling grouped vertical stacks of loaded receptacles to be dumped including means for receiving and supporting a group of stacks, means for delivering a selected stack from said group and a unit for inverting individual receptacles from their initial positions in said stack, the combination comprising stack tilting mechanism arranged to receive said selected stack and for moving the latter from its vertical position to a relatively reclining position, releasable clamp means for engaging opposed side portions of said selected stack to hold said receptacles relatively in substantial alignment during said tilting movement, means operative to release said clamp means when said stack reaches said reclining position, and conveyor means positioned to be approached by the selected stack upon reclining thereof.

3. In apparatus for handling grouped stacks of loaded receptacles to be dumped and a receptacle inverting unit, the combination comprising conveyor means extending laterally from said delivery means to said inverting unit, and stack tilting means pivotally mounted adjacent said delivery means, said stack tilting means comprising a bottom element for supporting receptacle stacks, releasable clamping members adjacent opposite sides of said means operative to engage receptacle stacks, means for pivoting said tilting means from a substantially vertical receiving position to a relatively reclining position immediately above said conveyor, and means for operating said clamping members.

4. In equipment of the class described, the combination comprising a conveyor, a stack tilter, and means for delivering stacks of receptacles to said stack tilter, said stack tilter comprising parallel spaced side members pivotally mounted at the lower end thereof, clamping means pivotally mounted on said side plates and adapted to grip receptacles delivered thereto, fluid pressure means for pivoting said stack tilter from a substantially vertical stack receiving position to an angularly related position above said conveyor, and means for moving said clamping means.

5. In equipment of the class described, the combination comprising a conveyor and a stack tilter for delivering vertically stacked receptacles to said conveyor, said stack tilter comprising a pair of spaced parallel side plates, a cover element pivotally arranged adjacent said side plates and adapted to overlie the uppermost receptacles placed in said stack tilter, pressure means for moving said stack tilter from a substantially vertical stack receiving position to an inclined position above said conveyor, clamping means pivotally mounted on said side plates and adapted to grip receptacles delivered thereto, pressure means for moving said clamping means, and means for moving said element.

6. In equipment of the class described, the combination comprising a pair of conveyors, a dividing element extending longitudinally between said pair of conveyors, and a stack tilter for delivering stacked receptacles to each of said conveyors, said stack tilter comprising means for supporting stacks of receptacles, clamping members carried by the stack tilter and adapted to grip receptacle stacks delivered thereto, means for moving said stack tilter from a substantially vertical stack receiving position to an angularly related position above said conveyors, and means for releasing said clamping members when said stack tilter is positioned above said conveyors, whereby receptacle stacks carried by said stack tilter are deposited on said conveyors.

7. In equipment of the class described, the combination comprising a conveyor, a stack tilting unit for delivering vertically stacked receptacles to said conveyor, said stack tilter comprising parallel spaced side plates pivotally mounted at the lower end thereof, clamping plates pivotally mounted on said side plates and adapted to grip receptacles delivered thereto, a cover plate pivotally mounted on said side plates at the upper end thereof and adapted to form a covering over the uppermost receptacles placed in said stack tilter, means for pivoting said stack tilter from a substantially vertical stack receiving position to an angularly related position above said conveyor, means for pivoting said clamping plates when said stack tilter is positioned above said conveyors, and an inverting means mounted at the discharge end of said conveyor.

8. In equipment of the class described, the combination comprising a conveyor, a stack tilting unit for delivering vertically stacked receptacles to said conveyor, said stack tilter comprising parallel spaced side plates pivotally mounted at the lower end thereof, clamping plates pivotally mounted on said side plates and adapted to grip said receptacles delivered thereto, a cover plate pivotally mounted on said side plates at the upper end thereof and adapted to form a covering over the uppermost receptacles placed in said tilter, means for pivoting said stack tilter from a substantially vertical position to an angularly related position overlying said conveyor, means for pivoting said clamping plates when said stack tilter is positioned above said conveyor, and an inverting unit mounted above the discharge end of said conveyor comprising a plurality of rollers adapted to engage said receptacles and to rotate with a peripheral speed greater than the linear speed of said receptacles on said conveyor.

9. In equipment of the class described, the combination comprising a pair of parallel conveyors, a stack tilting unit for delivering vertically stacked receptacles to said conveyors, said stack tilter comprising parallel spaced side plates pivotally mounted at the lower end thereof, clamping plates pivotally mounted on said side plates and adapted to grip said receptacles delivered thereto, and a cover plate pivotally mounted and said side plates at the upper end thereof and adapted to form a covering over the uppermost receptacles placed in said tilter, means for pivoting said stack tilter from a substantially vertical position to an inclined position above said conveyors, side rails mounted longitudinally on each side of said conveyor for maintaining said receptacles thereon, a divider element extending longitudinally over the center of said conveyor for separating said stacks of receptacles on said conveyor, and an inverting unit mounted above the discharge end of said conveyors comprising at least one roller for each of said stacks of receptacles adapted to engage the uppermost portion of said receptacles on said conveyor, and means for rotating said rollers with a peripheral speed greater than the speed of said receptacles on said conveyor.

10. In equipment of the class described, the combination comprising an elevated horizontal receiving platform adapted to support stacks of receptacles, a stack tilting unit adjacent said platform comprising a pair of parallel spaced side plates pivotally mounted at the lower portion thereof, a plurality of spaced rollers rotatably mounted between said side plates substantially level with said platform, clamping plates pivotally mounted on said side plates, and a cover plate pivotally mounted on said side plates at the upper end thereof, means for moving stacks of receptacles from said platform onto said rollers in said stack tilting unit, means for actuating said clamping plates to grip said stacked receptacles, means for actuating said cover plate to close the uppermost of said stacked receptacles, a pair of conveyors adjacent said stack tilter, means for pivoting said stack tilter from a substantially vertical receiving position to an inclined position over said conveyors, means for actuating said clamping plates and said cover plate for releasing said stacked receptacles onto said conveyor, divider and guide elements longitudinally disposed on said conveyor for aligning said receptacles, a plurality of rollers rotatably mounted above the discharge end of said conveyor for engaging said receptacles, and means for so revolving said rollers that their peripheral speed is greater than the linear speed of said receptacles on said conveyor to invert said receptacles.

11. In equipment of the class described, the combination comprising a rectangular base structure, an elevated horizontal receiving platform mounted substantially midway of the longitudinal dimension of said base and adapted to support transport pallets bearing a plurality of receptacles in stacked array, a stack tilting unit supported on said base adjacent to said platform comprising parallel spaced pedestal frames mounted on said base, a shaft suitably journaled on said frames, parallel spaced side plates welded at the lower portion thereof to said shaft, clamping plates pivotally mounted on said side plates, and a cover plate pivotally mounted between said side plates at the upper end thereof, pusher plate means mounted on one end of said base and adapted to travel across said platform moving said stacked receptacles to said stack tilter, fluid pressure piston means for actuating said clamping plates to grip said receptacles and for actuating said cover plate to close the uppermost of said stacked receptacles, conveyors adjacent to and extending from said stack tilter, fluid pressure piston means for pivoting said stack tilter from a substantially vertical receiving position to an inclined position over said conveyors, divider and guide elements longitudinally disposed on said conveyors for aligning said receptacles, rotatably mounted rollers disposed over the discharge end of said conveyors for engaging said receptacles, and means for so revolving said rollers that their peripheral speed is greater than the linear speed of said receptacles on said conveyor to invert said receptacles.

12. In stack handling and dumping equipment of the class described including means for successively delivering vertical unit stacks of loaded receptacles, and a receptacle inverting unit, the combination comprising conveyor means extending laterally from said delivery means to said inverting unit, and stack tilting means adjacent said delivery means for moving said unit stacks of receptacles to said conveyor means, said stack tilting means comprising parallel spaced side plates pivotally mounted at the lower end thereof, a clamping plate on each of said side plates extending inwardly and away from said stack delivery means and having a longtiudinal side portion terminating in a vertically disposed transverse flange pivotally mounted on each of said side plates for gripping said receptacle stacks, means for pivoting said stack tilting means from a substantially vertical stack receiving position to an angularly related position immediately above said conveyor, and means for actuating said clamping plates.

13. In stack handling and dumping equipment of the class described including means for successively delivering vertical unit stacks of loaded receptacles, and a receptacle inverting unit, the combination comprising conveyor means extending from said delivery means to said conveyor means, and stack tilting means adjacent said delivery means for moving said unit stacks of receptacles to said conveyor means, said stack tilting means comprising parallel spaced side plates pivotally mounted at the lower end thereof, a clamping plate on each of said side plates extending inwardly and away from said stack delivery means and each having a longitudinal side portion terminating in a vertically disposed transverse flange pivotally mounted on each of said side plates for gripping said receptacle stacks, a cover plate pivotally mounted on said side plates at the upper end thereof and adapted to form a lid over the uppermost receptacles placed in said stack tilting means, fluid pressure piston means for pivoting said stack tilting means from a substantially vertical receiving position to a relatively reclining position immediately above said conveyor, and fluid pressure piston means for actuating said clamping plates and said cover plate.

14. In equipment of the class described, the combination comprising a rectangular base structure, an elevated horizontal receiving platform mounted substantially midway of the longitudinal dimension of said base and adapted to support transport pallets bearing a plurality of receptacles in stacked array, parallel spaced pedestal frames mounted on said base adjacent said platform, a stack tilting unit pivotally mounted on said frames comprising a shaft suitably journaled on said frames, parallel spaced side plates welded at the lower portion thereof to said shaft, clamping plates extending inwardly and away from said platform and having a longitudinal side portion terminating in a vertically disposed transverse flange mounted on said side plates for gripping said receptacle stacks, a cover plate pivotally mounted on said side plates at the upper end thereof and adapted to form a lid over the uppermost receptacles in said stack tilting unit, a downwardly extending rocker rigidly attached substantially midway on said shaft, fluid pressure piston means engaging said rocker for pivoting said stack tilting unit from a substantially vertical receiving position to a relatively reclining delivering position, and means for actuating said clamping and cover plates, pusher plate means mounted on one end of said base and adapted to travel across said platform moving said stacked receptacles to said stack tilting unit, conveyor means for receiving said tilted receptacle stacks, divider and guide means longitudinally disposed on said conveyor means for aligning said stacks of receptacles, and an inverting unit mounted at the delivery end of said conveyor means for positively upending said receptacles.

15. Arrangement for transferring a stack of boxes from an upright to a reclined position for delivery to a box dumping mechanism comprising in combination a reclining conveyor adapted to receive a stack of boxes in reclining position to deliver them to the box dumping mechanism; a rocker having an elongated frame and stack supporting means provided at one end of said frame, said rocker being pivotally mounted adjacent the trailing end of said conveyor for oscillation from an upright initial position in which said supporting means is adapted to support an upright stack of boxes to a second position with said frame parallel to and closely above said conveyor, said frame defining an opening of sufficient size to permit the passage of said stack therethrough; retaining means on said frame projecting into said opening to retain a stack of boxes on said rocker as said rocker is reclined from its upright position; and means operative upon said rocker reaching said second position to retract said retaining means from said opening so that the entire stack of boxes may simultaneously drop through said frame onto said conveyor and said rocker may immediately return to its initial position.

References Cited in the file of this patent

UNITED STATES PATENTS

| 1,676,957 | Leaver et al. | July 10, 1928 |
| 1,906,126 | Mott | Apr. 25, 1933 |
| 2,127,007 | Paxton | Aug. 16, 1938 |
| 2,172,685 | Thompson | Sept. 12, 1939 |
| 2,254,550 | Stevenson | Sept. 2, 1941 |
| 2,520,252 | Mutchler | Aug. 29, 1950 |